Figure 1:
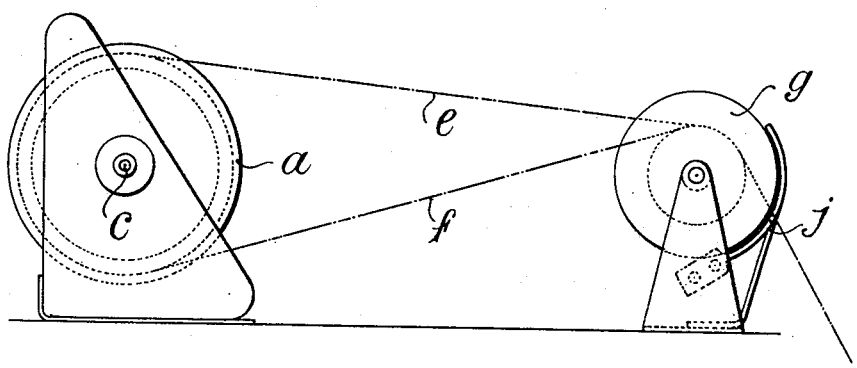

No. 771,639. PATENTED OCT. 4, 1904.
VAN SITTART HOWARD & A. E. H. MARESCAUX.
APPARATUS FOR TAKING SOUNDINGS AND INDICATING THE DEPTHS THEREOF.
APPLICATION FILED MAY 18, 1904.

NO MODEL. 7 SHEETS—SHEET 1.

WITNESSES:
Fred White
René Buine

INVENTORS:
Van Sittart Howard and
Alfred Edward Hay Marescaux,
By their Attorneys

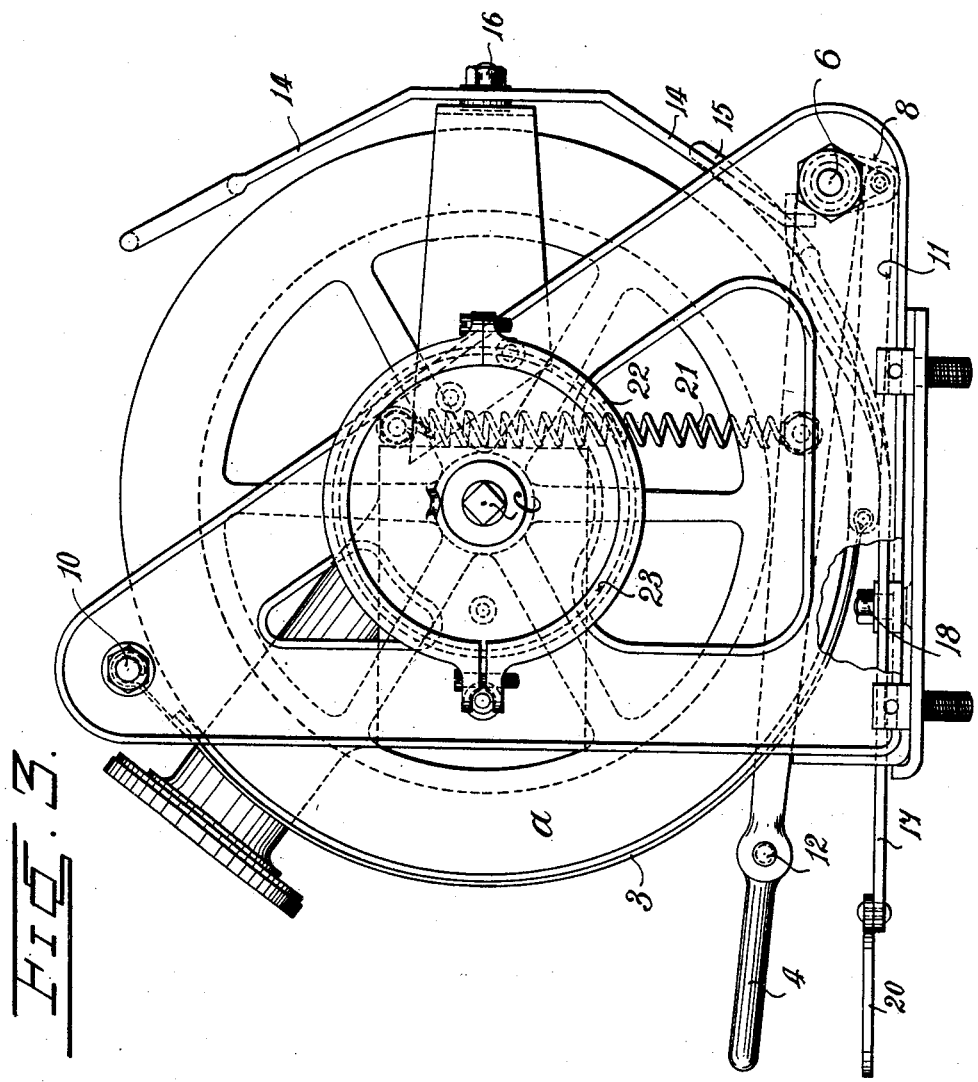

No. 771,639. PATENTED OCT. 4, 1904.
VAN SITTART HOWARD & A. E. H. MARESCAUX.
APPARATUS FOR TAKING SOUNDINGS AND INDICATING THE DEPTHS
THEREOF.
APPLICATION FILED MAY 18, 1904.
NO MODEL. 7 SHEETS—SHEET 3.
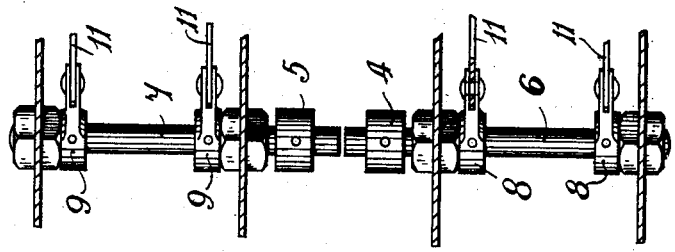
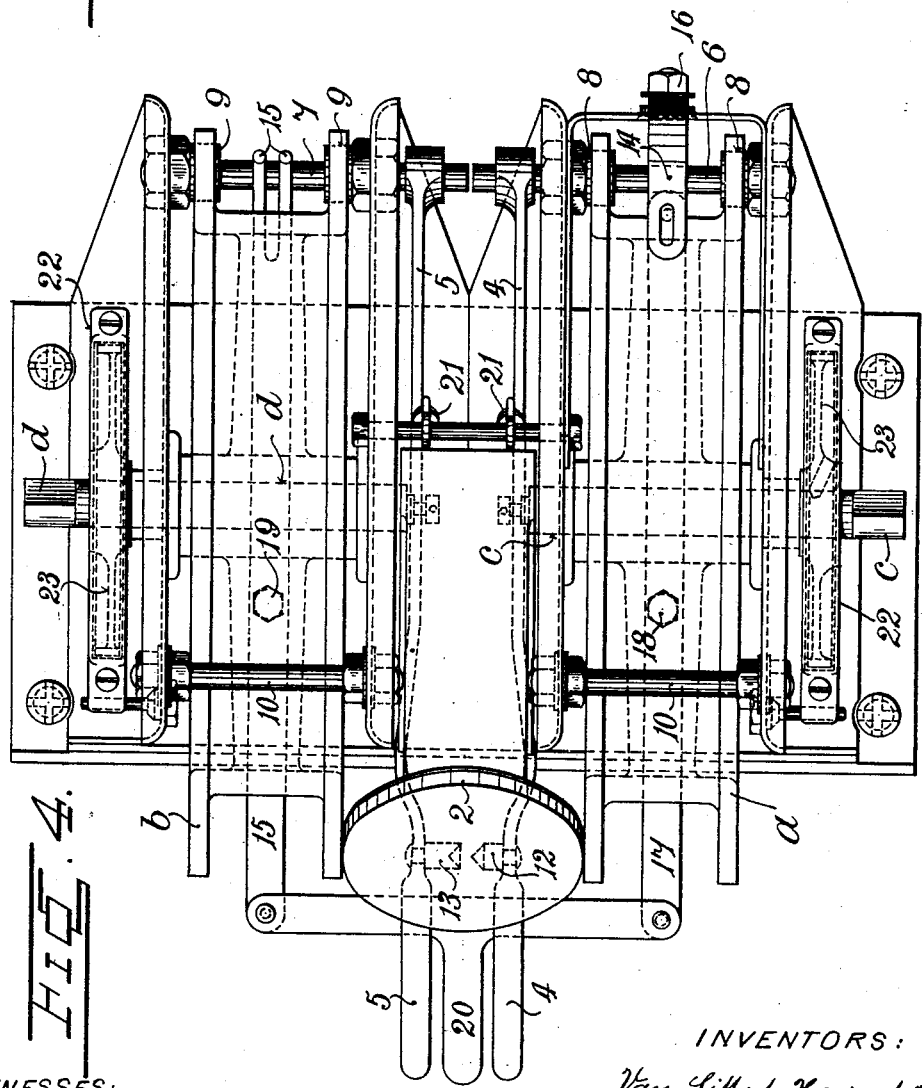
WITNESSES:
Fred White
René N...
INVENTORS:
Van Sittart Howard
Alfred Edward Hay Marescaux
By their Attorneys:
Arthur E. Fraser & Co.

No. 771,639. PATENTED OCT. 4, 1904.
VAN SITTART HOWARD & A. E. H. MARESCAUX.
APPARATUS FOR TAKING SOUNDINGS AND INDICATING THE DEPTHS
THEREOF.
APPLICATION FILED MAY 18, 1904.
NO MODEL. 7 SHEETS—SHEET 4.
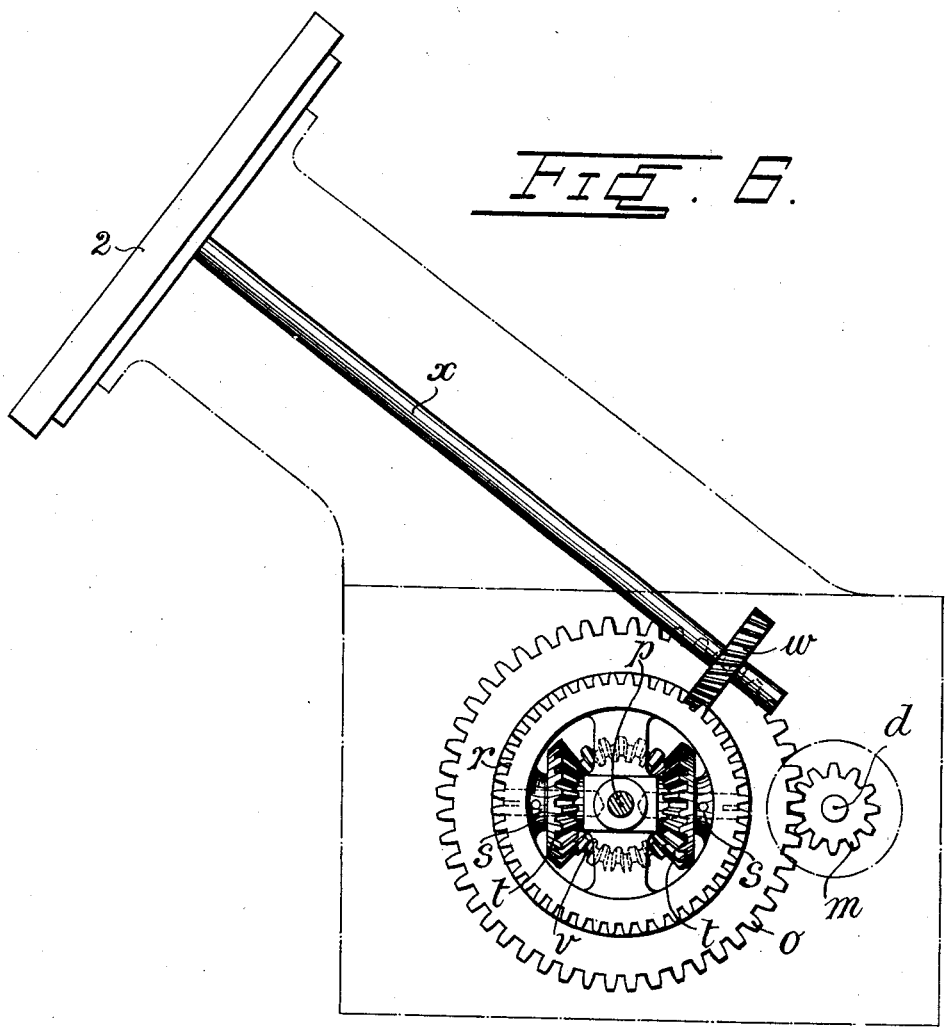
WITNESSES:
Fred White
René N Nuine
INVENTORS:
Van Sittart Howard and
Alfred Edward Hay Marescaux,
By their Attorneys:
Arthur E. Draper & Co.

No. 771,639. PATENTED OCT. 4, 1904.
VAN SITTART HOWARD & A. E. H. MARESCAUX.
APPARATUS FOR TAKING SOUNDINGS AND INDICATING THE DEPTHS THEREOF.
APPLICATION FILED MAY 18, 1904.
NO MODEL. 7 SHEETS—SHEET 6.

WITNESSES:
Fred White
René Bruire

INVENTORS:
Van Sittart Howard and
Alfred Edward Hay Marescaux,
By their Attorneys No. 771,639. PATENTED OCT. 4, 1904.
VAN SITTART HOWARD & A. E. H. MARESCAUX.
APPARATUS FOR TAKING SOUNDINGS AND INDICATING THE DEPTHS THEREOF.
APPLICATION FILED MAY 18, 1904.
NO MODEL. 7 SHEETS—SHEET 7.
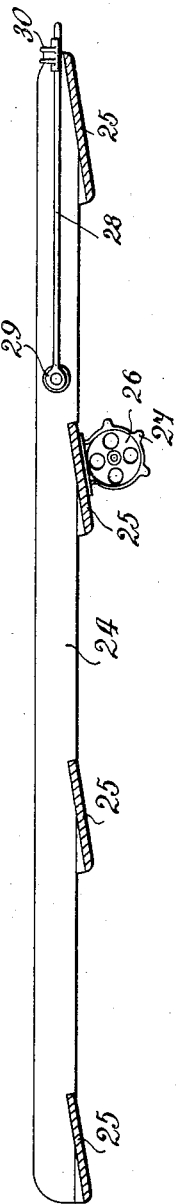
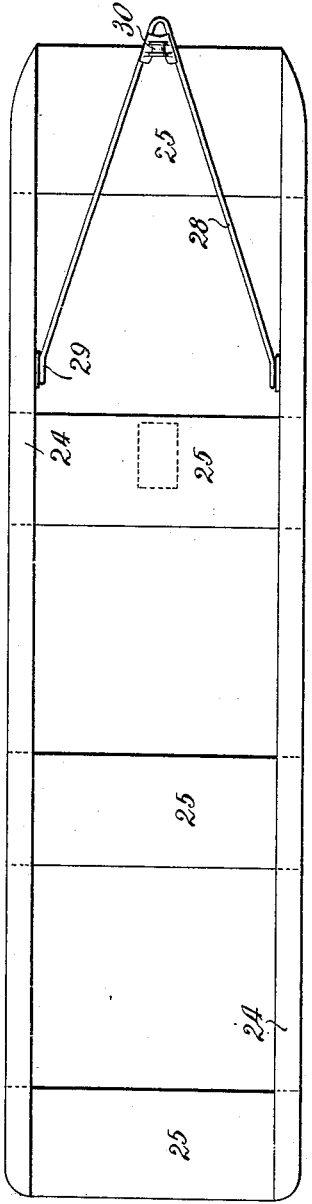
WITNESSES:
INVENTORS:

No. 771,639. Patented October 4, 1904.

UNITED STATES PATENT OFFICE.

VAN SITTART HOWARD, OF SIDCUP, AND ALFRED EDWARD HAY MARESCAUX, OF LONDON, ENGLAND.

APPARATUS FOR TAKING SOUNDINGS AND INDICATING THE DEPTHS THEREOF.

SPECIFICATION forming part of Letters Patent No. 771,639, dated October 4, 1904.

Application filed May 18, 1904. Serial No. 208,595. (No model.)

*To all whom it may concern:*

Be it known that we, VAN SITTART HOWARD, commander in His Majesty's British Royal Navy, of 4 High View road, Sidcup, Kent county, and ALFRED EDWARD HAY MARESCAUX, lieutenant in His Majesty's British Royal Navy, of 87 Edith road, West Kensington, London, England, both subjects of the King of Great Britain and Ireland, have invented certain new and useful Improvements in and Relating to Apparatus for Taking Soundings and Indicating the Depth Thereof, of which the following is a specification.

This invention relates to apparatus for taking soundings and for indicating the depth thereof.

Apparatus made in accordance with our invention comprises two drums or spools suitably mounted and each carrying a suitable length of wire. One wire is attached to a float and the other is passed through around one or more fair-leaders thereon and attached to a suitable weight. The spools are geared to or connected with an indicating or counting device adapted to show the length of wire paid out, or the indicating device may be arranged to show the difference between the respective lengths so paid out, or each wire may pass over or make contact with a suitable drum connected to the indicating apparatus. In use when it is desired to take a sounding, the vessel making, say, twenty knots an hour, the float, attached to one wire and having the other wire passed through one or more fair-leaders thereon and attached to a weight, as described, is heaved. The float remains practically stationary on the surface of the water, and the line attached thereto is paid out from the spool at a rate corresponding nearly with the speed of the vessel, (less friction on spool-axle.) The weight attached to the other line sinks to a point on the bottom vertically below the float, or nearly so, and the line attached thereto is paid out at a rate corresponding to the speed of the vessel nearly plus that due to the sinking weight. As soon as the weight touches the bottom both lines are paid out at the same rate, (unless there is a current,) and the difference between the respective lengths of the two wires paid out when the bottom is reached is the depth of the sounding, (very nearly.) This can either be obtained by reading the two indicators and taking the difference between them, or it could be indicated directly by a device arranged to indicate the difference.

Figure 2:
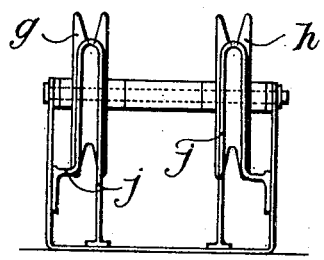
Figure 7:
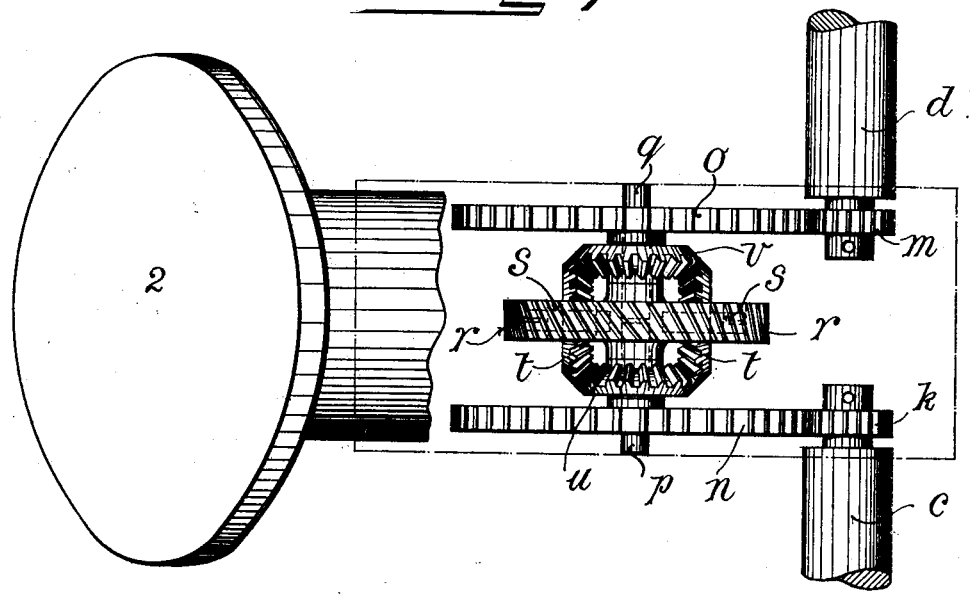
Figure 8:
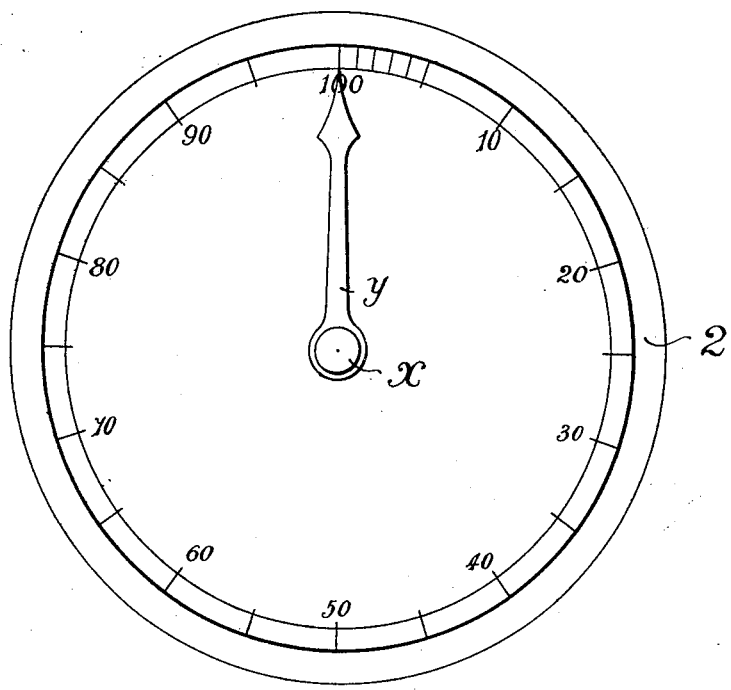
Figure 11:
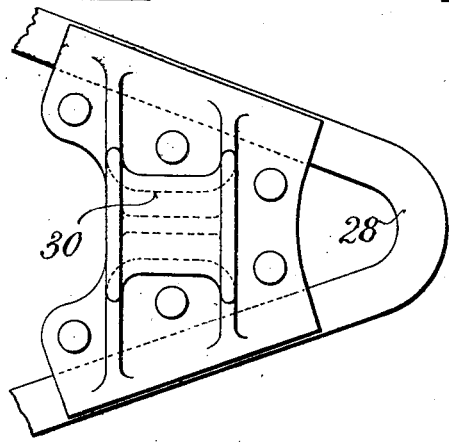
Figure 12:
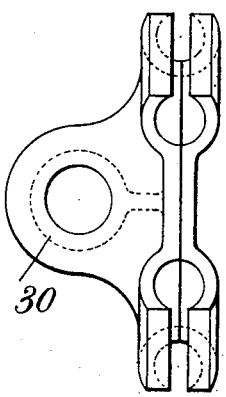

Referring now to the drawings, Figure 1 is a diagrammatic side elevation of one form of winding-gear for use with sounding apparatus made in accordance with our invention. Fig. 2 is an end elevation of the same. Fig. 3 is a detail side elevation of the winding-drums. Fig. 4 is a plan thereof. Fig. 5 is a detail view of the brake-rocking shaft. Fig. 6 is a side elevation of one form of indicating apparatus for use with our invention. Fig. 7 is a plan of the same. Fig. 8 shows the dial thereof. Fig. 9 is a sectional side elevation of one form of float adapted for use in taking soundings in accordance with our invention. Fig. 10 is a plan thereof, and Figs. 11 and 12 are detail views of the wire-lead in the towing-sling.

$a$ and $b$ are two drums mounted on separate axles $c$ and $d$ in bearings suitably disposed.

$e$ and $f$ are wires wound, respectively, on the drums $a$ and $b$ in opposite directions and lead over guide-pulleys $g$ and $h$, suitably mounted on separate axles.

$j\,j$ are guides to prevent the wires $e$ and $f$ from jumping out of the pulleys $g$ and $h$.

The axles $c$ and $d$ are disposed in line and are connected at their inner ends to pinions $k$ and $m$, gearing with spur-wheels $n$ and $o$, mounted on separate axles $p$ and $q$.

$r$ is a worm provided with two radial studs $s\,s$, upon which revolve bevel-wheels $t\,t$, adapted to gear with bevel-wheels $u$ and $v$, mounted on the shafts $p\,q$, respectively.

$w$ is a worm-wheel mounted on the shaft $x$ and adapted to gear with the worm $r$. The shaft $x$ is provided with a pointer $y$, which passes over the dial-face 2.

The drums $a$ and $b$ are each provided with band-brakes 3 3, Fig. 3, adapted to coact with the flanges of the drums $a$ and $b$ and to be operated by levers 4 and 5 through the medium of separate rocking shafts 6 and 7 and lugs 8

8 and 9 9, suitably mounted thereon. The band-brakes are secured to the cross-bolts 10 10 at one end and connected at the other to the lugs 8 8 9 9 by links 11 11 11 11. The brake-levers are provided with mating lugs 12 and 13, and the levers are sufficiently resilient to enable them to be squeezed together, so that the mating lugs engage with one another. In this manner the two brake-levers may be operated simultaneously or independently.

The axles c and d are provided with squared ends, to which handles may be fitted for the purpose of rotating the drums.

To insure the regular winding of the wire, the drums a and b are provided with guides 14 and 15, respectively. The guide 14 is pivoted at 16 and operated by a lever 17, pivoted at 18. The guide 15 is pivoted at 19. The guide and the lever 17 are connected to and simultaneously operated by a common handle 20, by means of which each guide is traveled across the face of its respective drum, and by this means the wire may be regularly wound.

21 21 are springs for releasing the brakes and returning the brake-levers 4 and 5 to their normal or off position.

22 22 are friction-brakes constantly coacting with drums 23 23 to prevent the drums a and b from running away.

In Figs. 9 and 10, 24 24 are side frames of the float, secured together by battens 25 25, inclined thereto at an angle of about nine degrees. 26 is a fair-leader in a sheave 27, secured to one of the battens 25. One of the wires—say e—passes over the fair-leader 26 and is attached to the lead or sinker. The other, f, is attached to the float by means of a towing-sling 28, pivoted to the side frames 24 24 at 29 29. In the fork of the towing-sling 28 is disposed a wire-lead 30, through which the wire e passes.

In operation when it is desired to take a sounding the float is heaved after the wires have been properly arranged and attached. The float settles down and remains practically still on the surface of the water, so that the wire f, which is attached to the float, is paid out at a speed nearly corresponding with that of the vessel. At the same time the lead sinks vertically below the float, or nearly so, and the wire e is paid out at a speed nearly equal to that of the vessel plus the velocity of the descending lead. As soon as the bottom is reached, which can be distinctly felt or which can be indicated by some well-known device, the brake-levers 4 and 5 are seized and gripped together and depressed to apply the brakes. The indicator then shows the difference between the lengths of wire paid out, and consequently the depth of the sounding. If, however, the ship be in a current, the float, after the lead reaches the bottom, will not remain vertically over it and the indicator will move slowly on. With a current moving against the course of the vessel the indicator is more distinctly checked at the instant the lead reaches the bottom than with the current in any other direction; but it has been found on experiment that any inaccuracy resulting therefrom is comparatively small. As soon as the brakes are applied the float is towed, and owing to the inclination of the cross-battens it skips along the surface of the water, offering very little resistance and causing only a slight strain on the wire. The wires are then wound in until the lead reaches the float and the dial set or corrected to zero, and another sounding can be taken without taking in the float, and it has been found that soundings can be taken every thirty or forty seconds in seven fathoms of water with a vessel at full speed, and, further, it has been found that very accurate soundings can be obtained in twenty fathoms of water in nine seconds after releasing the brakes.

What we claim, and desire to secure by Letters Patent, is—

1. In apparatus for taking soundings from a vessel, and indicating the depth, the combination of a float, a guide disposed on the float, two drums disposed on the vessel, a sinker, a wire attaching the float to one of the drums, a wire attaching the sinker to the other drum, and a device to indicate the difference between the paid-out lengths of wires, said device comprising two bevel-wheels each rotated by one of said drums, a pair of bevel-wheels gearing with the aforesaid bevel-wheels and mounted on studs in an encircling wheel, and means for indicating the revolution of said encircling wheel, substantially as described.

2. In apparatus for taking soundings from a vessel, and indicating the depth, the combination of a float, a guide disposed on the float, said float being provided with transverse battens inclined at an angle to the horizontal, two drums disposed on the vessel, a sinker, a wire attaching the float to one of the drums, a wire attaching the sinker to the other drum, and a device to indicate the difference between the paid-out lengths of the wires.

3. In apparatus for taking soundings from a vessel, and indicating the depth, the combination of, a float, a guide disposed on the float, said float being provided with transverse battens inclined at an angle to the horizontal, two drums disposed on the vessel, a sinker, a wire attaching the float to one of the drums, a wire attaching the sinker to the other drum, means for stopping the drums when the bottom has been reached, and a device to indicate the difference between the paid-out lengths of the wire, substantially as described.

4. In apparatus for taking soundings from a vessel, and indicating the depth, the combination of, a float, a guide disposed on the float, said float being provided with transverse battens inclined at an angle to the horizontal, and provided with a towing-sling hinged to the float, and a guiding-eye disposed in the bend of the sling, two drums disposed on the vessel, a sinker, a wire attaching the float to one of the drums, a wire attaching the sinker to the other drum, means for retarding the speed of the drums while the wires are being paid out, means for stopping the drums when the bottom has been reached, and a device to indicate the difference between the paid-out lengths of the wires, substantially as described.

5. In apparatus for taking soundings from a vessel, and indicating the depth, the combination of, a float, a guide disposed on the float, two drums disposed on the vessel, said drums being mounted on separate axles disposed in line with one another, a train of wheels disposed between the two drums and operated thereby, a pointer operated by said train of wheels to show the difference between the paid-out lengths of the wires, a sinker, a wire attaching the float to one of the drums, a wire attaching the sinker to the other drum, and means for stopping the drums when the bottom has been reached, substantially as described.

6. In apparatus for taking soundings from a vessel, and indicating the depth, the combination of, a float, a guide disposed on the float, two drums disposed on the vessel, a sinker, a wire attaching the float to one of the drums, a wire attaching the sinker to the other drum, a brake-disk mounted on each of said drum-axles and a friction-brake constantly applied to each of said disks, a brake on each drum adapted to be operated both independently and simultaneously, and a device to indicate the difference between the paid-out lengths of the wires, substantially as described.

7. In apparatus for taking soundings from a vessel, and indicating the depth, the combination of, a float, a guide disposed on the float, said float being provided with transverse battens inclined at an angle to the horizontal and provided with a towing-sling hinged to the float, and a guiding-eye disposed in the bend of the sling, two drums disposed on the vessel, a sinker, a wire attaching the float to one of the drums, a wire attaching the sinker to the other drum, a brake-disk mounted on each of said drum-axles and a friction-brake constantly applied to each of said disks, a brake on each drum adapted to be operated both independently and simultaneously, and a device to indicate the difference between the paid-out lengths of the wires, substantially as described.

8. In apparatus for taking soundings from a vessel, and indicating the depth, the combination of a float, a guide disposed on the float, two drums disposed on the vessel, a sinker, a wire attaching the float to one of the drums, a wire attaching the sinker to the other drum, a stationary dial-face, and means for moving a hand over a stationary face to indicate the difference between the paid-out lengths of the wires.

9. In apparatus for taking soundings from a vessel, and indicating the depth, the combination of, a float, a guide disposed on the float, said float being provided with transverse battens inclined at an angle to the horizontal, and provided with a towing-sling hinged to the float, and a guiding-eye disposed in the bend of the sling, two drums disposed on the vessel, a sinker, a wire attaching the float to one of the drums, a wire attaching the sinker to the other drum, means for winding up each of the wires on the drums and guiding them over the surface thereof, a brake-disk mounted on each of said drum-axles and a friction-brake constantly applied to each of said disks, a brake on each drum adapted to be operated both independently and simultaneously, and a device to indicate the difference between the paid-out lengths of the wires, substantially as described.

10. In apparatus for taking soundings from a vessel, and indicating the depth, the combination of a float, a guide disposed on the float, two drums disposed on the vessel, a sinker, a wire attaching the float to one of the drums, a wire attaching the sinker to the other drum, means for winding up each of the wires on the drums and guiding them over the surface thereof, and a device to indicate the difference between the paid-out lengths of the wires said device comprising two bevel-wheels each rotated by one of said drums, a pair of bevel-wheels gearing with the aforesaid bevel-wheels and mounted on studs in an encircling wheel, and means for indicating the revolution of said encircling wheel.

11. In apparatus for taking soundings from a vessel, and indicating the depth, the combination of a float, a guide disposed on the float, two drums disposed on the vessel, a sinker, a wire attaching the float to one of the drums, a wire attaching the sinker to the other drum, means for retarding the speed of the drums while the wires are being paid out, means for stopping the drums when the bottom has been reached, and a device to indicate the difference between the paid-out lengths of the wires, said device comprising two bevel-wheels, each rotated by one of said drums, a pair of bevel-wheels gearing with the aforesaid bevel-wheels and mounted on studs in an encircling wheel, and means for indicating the revolution of said encircling wheel.

In witness whereof we have hereunto signed our names in the presence of two subscribing witnesses.

VAN SITTART HOWARD.
ALFRED EDWARD HAY MARESCAUX.

Witnesses:
REGINALD EATON ELLIS,
GORDON MELVILLE CLARK.